May 20, 1947.  P. C. HUTTON  2,420,825
MECHANICAL POWER UNIT
Filed July 14, 1945  2 Sheets—Sheet 2
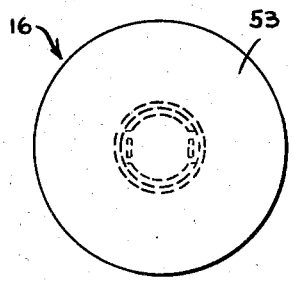
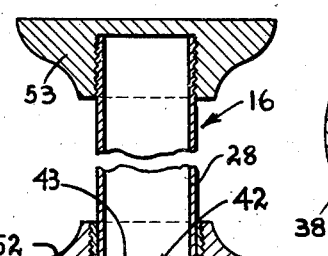
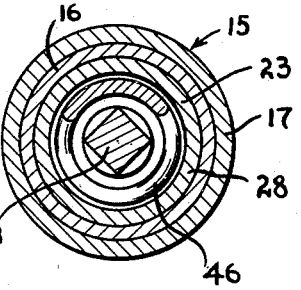
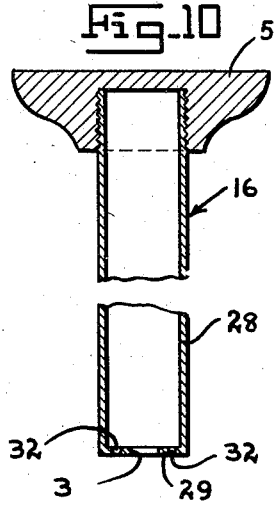
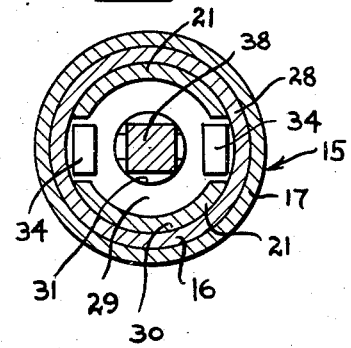
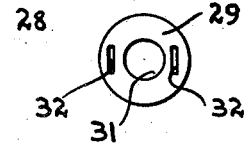
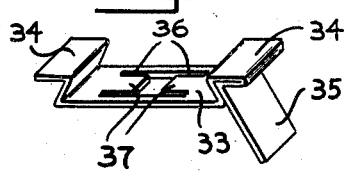
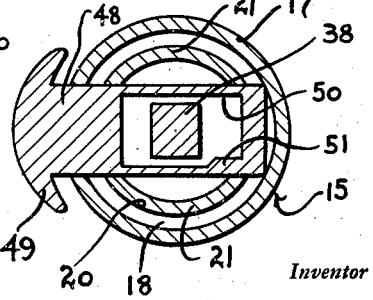
Inventor
Paul C. Hutton
By *Clarence A. O'Brien and Harvey B. Jacobson*
Attorneys

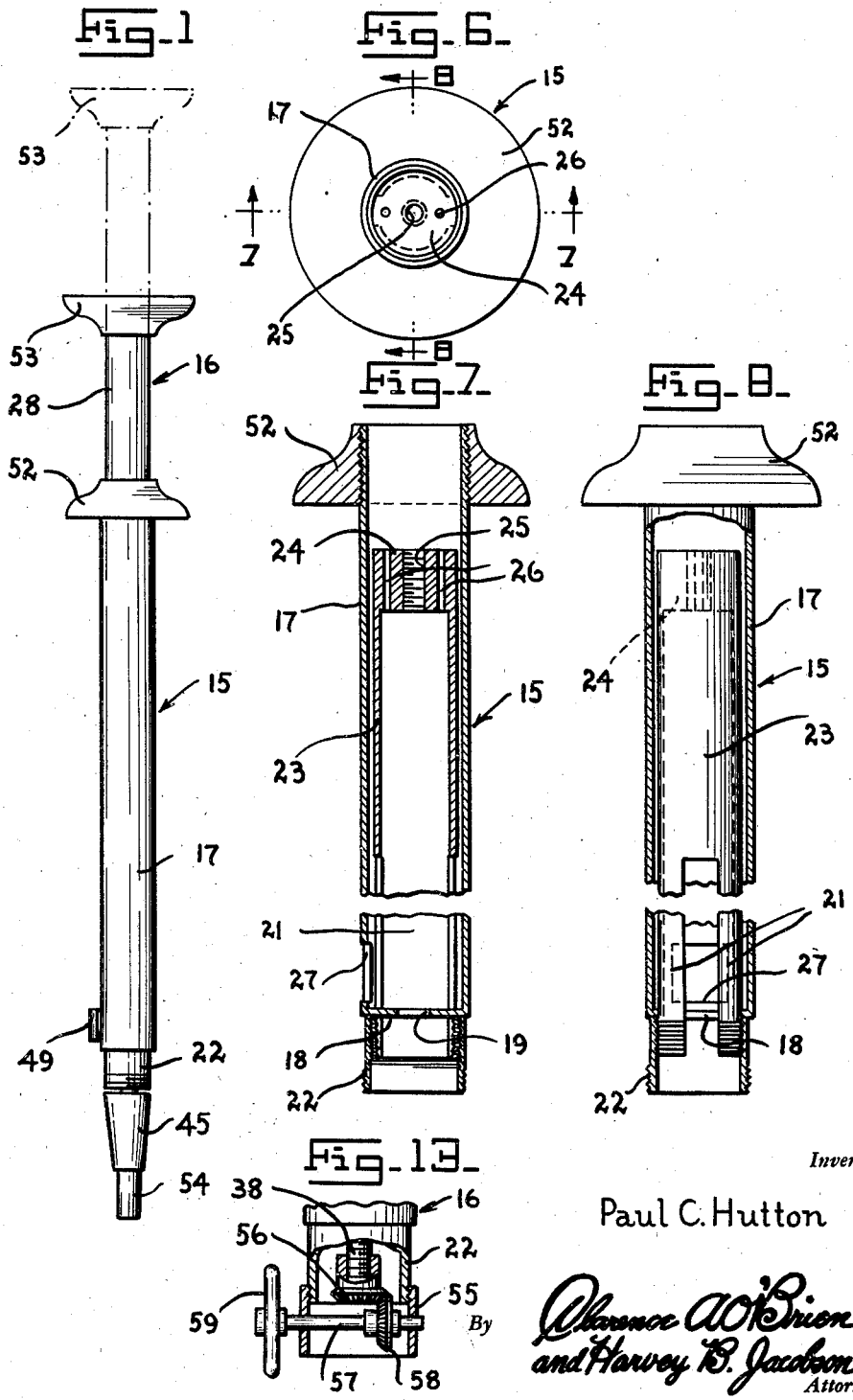

UNITED STATES PATENT OFFICE 2,420,825

MECHANICAL POWER UNIT

Paul C. Hutton, Washington, D. C.

Application July 14, 1945, Serial No. 605,038

14 Claims. (Cl. 74—57)

This invention relates to a mechanical power unit, and more particularly to a device designed primarily for erasing mechanically.

The primary object of the invention is to store energy in a compression coil spring and to convert the longitudinal movement of the coil spring into rotary motion for various purposes, such as driving an eraser, operating a small drill, or for any other purpose where rotary motion may be employed or desired.

Another object is to periodically store the energy in the spring for repeated operation and to govern the rapidity with which the energy stored in the spring may be dispensed.

A further object is to so control the rotary elements of the device that they may be stopped against the energy of the spring, or started again by the spring energy at the will of the user.

The above and other objects may be attained by employing this invention which embodies among its features a telescopic housing within one element of which a shaft is mounted to rotate about its longitudinal axis, said shaft being provided with an external spiral, a nut carried by the cooperating housing and adapted to engage the spiral of the shaft whereby when the nut moves longitudinally thereof, the shaft will be rotated, a spring within the housing to cause relative motion between the telescopic elements thereof, and a chuck carried by the shaft to which an instrument, such as an eraser, drill or similar device, may be secured to be driven by the shaft.

Other features embody manually controlled means to arrest the rotation of the shaft, and pneumatic means to regulate the speed of motion between the telescopic elements, and thereby govern the speed at which the shaft may rotate under the influence of the spring.

In the drawings:

Figure 1 is a side view of a mechanical power unit embodying the features of this invention showing the same equipped for use as an eraser.

Figure 2 is a longitudinal sectional view through Figure 1 on an enlarged scale.

Figure 3 is a transverse sectional view taken substantially on the line 3—3 of Figure 2, on a greatly enlarged scale.

Figure 4 is a transverse sectional view taken substantially on the line 4—4 of Figure 2, on a greatly enlarged scale.

Figure 5 is a transverse sectional view taken substantially on the line 5—5 of Figure 2, on a greatly enlarged scale.

Figure 6 is a top plan view of the outer telescopic unit of the device.

Figure 7 is a longitudinal sectional view substantially on the line 7—7 of Figure 6.

Figure 9 is a top plan of the inner telescopic unit of the device.

Figure 10 is a longitudinal sectional view through Figure 9.

Figure 11 is a bottom plan view of the inner telescopic member.

Figure 12 is a detail perspective view of the shaft driving nut, and

Figure 13 is a fragmentary side view of the lower operating end of the device partly in section showing a modified form of eraser and eraser mounting.

Referring to the drawings in detail, the power unit comprises a pair of telescopic members 15 and 16. The telescopic member 15 comprises a tubular body 17 closed at its lower end by a bottom wall 18 having a central aperture 19, the purpose of which will be more fully hereinafter described. The bottom wall 18 is formed with a pair of arcuate slots 20 arranged concentrically in spaced relation to the outer cylindrical wall for the reception of arcuate guides 21 which project upwardly in spaced concentric relation with the tubular body 17 to a point near the upper end thereof. These arcuate guides project through the slots 20 and are provided with external screw threads for the reception of an internally screw-threaded collar 22 which is adapted to abut the bottom side of the bottom 18 to securely hold the guides in place. As illustrated in Figure 8, the upper ends of the guides are joined to form a tubular member 23 which is closed at its upper end by a relatively thick wall 24 which is provided with a centrally located internally screw-threaded opening 25 which in turn is surrounded by an annular series of openings 26 extending in parallel relation to the axis of the tubular member 23. Formed adjacent the lower end of the tubular body 17 is an opening 27 through which the latch member, to be more fully hereinafter described, enters the body 17. It is to be noted that the opening 27 aligns with the diametrically opposed spaces between the arcuate guides 21.

The telescopic member 16 comprises a tubular body 28 which is slidably fitted between the arcuate guides 21 and the inner face of the tubular body 17, and carried at the lower end of the tubular body 28 is a bottom 29 formed with arcuate slots 30 for the reception of the guides 21 and a central opening 31 for a purpose to be more fully hereinafter described. Formed at diametrically opposite points in the bottom 29 and between the ends of the slots 30 are spaced parallel slots 32 in which the specially formed twisting nut is adapted to be held.

The twisting nut above referred to comprises a rectangular body 33 formed of a thin flexible spring metal and having at opposite ends anchoring hooks 34 which are adapted to be passed through the slots 32 to secure the nut to the bottom 29. Projecting downwardly and outwardly from one end of the nut 33 is a yielding arm 35, the purpose of which will hereinafter appear. Formed in the body 33 intermediate its ends is a pair of U-shaped incisions 36 which form tongues 37 to yieldingly engage the drive shaft, which will be more fully hereinafter described.

The drive shaft above referred to is designated generally 38 and comprises a rectangular bar which is twisted for the major part of its length, as at 39. The upper end of the bar is provided with a needlepoint bearing 40 which is received in the bore 25 and entering the bore from its opposite end is a threaded shank 41 of a retaining member designated generally 42. The shank 41 is threaded into the threaded recess 25 in the end wall 24 of the tubular member 23 and carries at the extreme upper end a head 43 of relatively large diameter. The lower end of the shaft 38 is journaled in the opening 19 and projects slightly beyond the lower end of the bottom wall 18, as illustrated. The extreme lower end of the shaft is provided with external screw threads 44 to which a suitable instrument-holding chuck 45 is adapted to be secured. Extending between the inner face of the end wall 24 and the bottom wall 29 is a compression coil spring 46, and fitted in the tubular member 28 immediately above the end wall 24 is a valve member 47. This valve member is adapted to slide longitudinally within the tubular member 28 and between the wall 24 and the head 43, as will be readily seen upon reference to the drawings.

Slidably mounted on the bottom 18 of the outer tubular member 17 is a yoke 48, one end of which projects through the opening 27 and carries a head 49 by means of which its movements may be controlled. This yoke is provided with a centrally arranged, rectangular aperture 50, the back wall of which carries a latch dog 51, which, when the yoke is moved in such a manner that the head is spaced from the outer tubular member 17, will engage the shaft 38 so as to arrest rotation thereof under the influence of the spring 46. Suitable handles, or pulls 52 and 53 are attached to the telescopic members 17 and 16, respectively, for the purpose of facilitating their separation when preparing the device for operation.

The chuck 45 may be made to fit a suitable cylindrical eraser 54 so as to provide a directly driven eraser, or the chuck body may be removed and a disc-type eraser substituted, as will be hereinafter described.

In Figure 13, I have illustrated the equipment necessary for utilizing a disc-type eraser. This structure comprises an internally screw-threaded sleeve 55 which is adapted to be threaded onto the threaded end of the sleeve 22. Likewise, a bevel pinion 56 is adapted to be threaded onto the threaded end 44 of the shaft 38, and mounted to rotate transversely of the longitudinal axis of the sleeve 55 is a shaft 57 carrying a bevel pinion 58 which is adapted to mesh with the bevel pinion 56. As illustrated in Figure 13, one end of the shaft 57 projects beyond the outer side of the cylinder 55 and carries a disc-type eraser 59. It will thus be seen that when the pinion 56 is driven by the shaft 38, the eraser 59 also will be driven.

In operation, energy is stored in the spring 46 by exerting pull on the handle 53 while holding the handle 52 stationary, or by separating the handles 52 and 53, thus causing the telescopic member 16 to move outwardly with relation to the telescopic member 15. Such outward movement causes the bottom 29 of the inner telescopic member 16 to move away from the bottom 18 of the telescopic member 15 so as to place the spring 46 in compression. In so moving the bottom wall 29, the nut 33 will also be moved and due to the flexibility of the tongues 37, they will ratchet harmlessly over the spiral ribs on the shaft 38. Assuming that the yoke 48 is projected out through the opening 27 and the dog 51 is in engagement with the shaft 38 adjacent its lower end, it will be obvious that the shaft will be held against rotation. However, upon pressing the head 49 inwardly, the dog 51 will be moved away from contact with the shaft 38, thus allowing the shaft to rotate under the influence of the spring 46 pushing on the nut 33, it being understood that the tongues 37 engage the spirals 39 of the shaft as the nut moves under the influence of the spring. The slight frictional contact existing between the valve 47 and the wall of the tubular member 28 causes the valve to seat against the outer end of the end wall 24 so as to close the opening 26 and hence by the pneumatic action thus retard the movement of the parts under the influence of the spring 46. In this way, it will be obvious that the speed of rotation of the shaft 38 will thus be retarded so as to insure a smooth uniform operation of the device throughout its period of use. As the spring moves the nut 33 downwardly, the spring finger 35 carried thereby will engage the inner end of the yoke 48, thus causing it to be moved outwardly so as to bring the latch 51 into engagement with the shaft 38 ready for a recharging of the spring.

Obviously if so desired a suitable spring may be interposed between the back of the yoke 48 and the inner face of the tubular body 17 which will serve yieldingly to urge the yoke outwardly so as to hold the latch dog 51 in engagement with the shaft 38. When such a spring is employed the shaft will be held against rotation until pressure is applied on the head 49, thus placing the shaft under manual control.

While in the foregoing there has been shown and described the preferred embodiment of this invention, it is to be understood that minor changes in the details of construction, combination and arrangement of parts may be resorted to without departing from the spirit and scope of the invention as claimed.

I claim:

1. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached.

2. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and releasable means to hold the shaft against rotation.

3. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and handles on the telescopic housing to facilitate the extension of the housing against the force of the spring.

4. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and releasable means to hold the shaft against rotation, and handles on the telescopic housing to facilitate the extension of the housing against the force of the spring.

5. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and means to retard the speed of movement of the nut along the shaft.

6. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and releasable means to hold the shaft against rotation, and means to retard the speed of movement of the nut along the shaft.

7. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and releasable means to hold the shaft against rotation, and handles on the telescopic housing to facilitate the extension of the housing against the force of the spring, and means to retard the speed of movement of the nut along the shaft.

8. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and pneumatic means to retard the telescoping of the telescopic housing under the influence of the spring and hence retard the speed of rotation of the shaft.

9. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and releasable means to hold the shaft against rotation, and pneumatic means to retard the telescoping of the telescopic housing under the influence of the spring and hence retard the speed of rotation of the shaft.

10. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and a valve in the housing adapted to trap air between certain parts thereof whereby the speed of telescopic movement of the housing under the influence of the spring will be retarded.

11. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and releasable means to hold the shaft against rotation, and a valve in the housing to trap air between certain parts thereof whereby the speed of the telescopic movement of the housing under the influence of the spring will be retarded.

12. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and a valve in the housing adapted to trap air between certain parts thereof whereby the speed of telescopic movement of the housing under the influence of the spring will be retarded, and means to render the valve inoperative when the housing is being extended against the force of the spring.

13. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and releasable means to hold the shaft against rotation, and a valve in the housing to trap air between certain parts thereof whereby the speed of the telescopic movement of the housing under the influence of the spring will be retarded, and means to render the valve inoperative when the housing is being extended against the force of the spring.

14. A mechanical power unit which includes a telescopic housing, a spirally twisted shaft rotatably mounted within the housing, a nut carried by one member of the telescopic housing, said nut having threaded engagement with the shaft whereby when the nut is moved axially thereof the shaft will be rotated, a spring adapted to urge the nut to move longitudinally in one direction along the shaft, means to compress the spring when the housing is moved to extended position against the tension of the spring, and a chuck carried by the shaft to which an eraser or the like may be attached, and releasable means to hold the shaft against rotation, and handles on the telescopic housing to facilitate the extension of the housing against the force of the spring, and pneumatic means to retard the telescoping of the telescopic housing under the influence of the spring and hence retard the speed of rotation of the shaft.

PAUL C. HUTTON.